United States Patent [19]
LaRue

[11] Patent Number: 5,274,560
[45] Date of Patent: Dec. 28, 1993

[54] SENSOR FREE VEHICLE NAVIGATION SYSTEM UTILIZING A VOICE INPUT/OUTPUT INTERFACE FOR ROUTING A DRIVER FROM HIS SOURCE POINT TO HIS DESTINATION POINT

[75] Inventor: Charles LaRue, La Canada, Calif.

[73] Assignee: Audio Navigation Systems, Inc., La Canada, Calif.

[21] Appl. No.: 675,632

[22] Filed: Mar. 27, 1991

Related U.S. Application Data

[63] Continuation-in-part of Ser. No. 621,577, Dec. 3, 1990, abandoned.

[51] Int. Cl.⁵ ............................................. G06F 15/50
[52] U.S. Cl. ..................................... 364/444; 364/449; 340/988; 381/42; 395/2
[58] Field of Search ............... 364/443, 444, 454, 449, 364/436–438, 419; 340/990, 995, 905, 988; 395/2; 381/41, 42, 43, 51

[56] References Cited

U.S. PATENT DOCUMENTS

| | | | |
|---|---|---|---|
| 4,242,731 | 12/1980 | Mizote et al. | 364/436 |
| 4,502,123 | 2/1985 | Minami et al. | 364/499 |
| 4,630,209 | 12/1986 | Saito et al. | 364/444 |
| 4,677,429 | 6/1987 | Glotzbach | 340/711 |
| 4,679,147 | 7/1987 | Tsujii et al. | 364/449 |
| 4,758,959 | 7/1988 | Thoone et al. | 364/454 |
| 4,796,189 | 1/1989 | Nakayama et al. | 364/449 |
| 4,797,924 | 1/1989 | Schnars et al. | 381/43 |
| 4,827,520 | 5/1989 | Zeinstra | 381/43 |
| 4,829,578 | 5/1989 | Roberts | 381/46 |
| 4,882,696 | 11/1989 | Nimura et al. | 364/449 |
| 4,907,159 | 3/1990 | Mauge et al. | 364/436 |
| 4,954,958 | 9/1990 | Savage et al. | 364/444 |
| 4,984,168 | 1/1991 | Neukrichner et al. | 364/449 |
| 5,041,983 | 8/1991 | Nakahara et al. | 364/449 |
| 5,089,826 | 2/1992 | Yano et al. | 342/457 |
| 5,115,399 | 5/1992 | Nimura et al. | 364/449 |
| 5,126,941 | 6/1992 | Gurmu et al. | 364/424.02 |

FOREIGN PATENT DOCUMENTS

| | | |
|---|---|---|
| 372840 | 6/1990 | European Pat. Off. . |
| 719017 | 12/1988 | Fed. Rep. of Germany . |
| 2108111 | 5/1987 | Japan . |

OTHER PUBLICATIONS

SAE Technical paper Series, vol. 870139, Warrendale, PA., 1987, M. L. G. Thoone et al.,: "The Car Information and Navigation System Carin and the Use of Compact Disc Interface".

IEEE Transactions on Instrumentation and Measurement, vol. 37, No. 4, Dec. 1988, New York, US, pp. 586-590; S. S. Awad: "Voice Technology in the Instrumentation of the Automobile".

"Computer Software Information Management"; Lesk; Scientific American, vol. 251, No. 3, Sep. 1984.

*Primary Examiner*—Vincent N. Trans
*Attorney, Agent, or Firm*—Spensley, Horn, Jubas & Lubitz

[57] ABSTRACT

An audio navigation system including an artificial intelligence routing algorithm which does not require any internal or external sensors to locate the vehicle. The interface with the driver is via voice input and voice output and is therefor visually non-distracting and safe to use when the vehicle is in motion. The hardware is built around an optical disk player and therefor can be used for entertainment as well as navigation functions. Digitized maps, compressed voice records and the computer programs are stored on an optical disk.

13 Claims, 8 Drawing Sheets

SINGLE PROCESSOR NAVIGATOR WITH TRAFFIC UPDATE AND DRIVE SHAFT SENSOR

FIG. 1  SINGLE PROCESSOR NAVIGATOR WITH TRAFFIC UPDATE AND DRIVE SHAFT SENSOR

FIG. 3 SINGLE PROCESSOR – ONE SENSOR NAVIGATOR

FIG. 4  DUAL PROCESSOR, TRAFFIC UPDATE — ONE SENSOR NAVIGATOR

FIG. 5   MULTI LEVEL MAPPING SYSTEM

FIG. 6 SPEECH TRAINING FUNCTIONAL FLOW

FIG. 7  SPEECH RECOGNITION FLOW DIAGRAM

SENSOR FREE VEHICLE NAVIGATION SYSTEM UTILIZING A VOICE INPUT/OUTPUT INTERFACE FOR ROUTING A DRIVER FROM HIS SOURCE POINT TO HIS DESTINATION POINT

RELATED APPLICATION

This application is a continuation-in-part of application Ser. No. 07/621,577, filed Dec. 3, 1990, now abandoned.

NOTICE REGARDING COPYRIGHTED MATERIAL

A portion of the disclosure of this patent document contains materials which is subject to copyright protection. The copyright owner has no objection to the facsimile reproduction by anyone of the patent document or the patent disclosure as it appears in the Patent and Trademark office patent file or records, but otherwise reserves all copyright rights whatsoever.

BACKGROUND OF THE INVENTION

1. Field of the Invention

This invention relates in general to navigation systems, and more particularly to a navigation system incorporating artificial intelligence that is useful for cars and trucks requiring no sensors for spatially locating the vehicle and which uses an audio, rather than visual, interface with the driver.

2. Description of the Related Art

Many existing navigation systems utilize internal sensors or navigation satellites to locate the subject vehicle with respect to a digital map and then, once located, create a visual presentation of the map, the location of the vehicle and the destination point on a CRT mounted in the dashboard or elsewhere in the vehicle. Some systems also calculate a preferred route which is highlighted on the displayed map. A great deal of effort and technology is used in these systems in order to locate the vehicle as accurately as possible in order to perform the navigation function.

U.S. Pat. Nos. 4,630,209; 4,829,578; 4,502,123; 4,242,731; 4,679,147; 4,796,189; 4,677,429; 4,882,696; 4,749,924; 4,758,959 and 4,827,520 pertain to car navigation systems or to voice actuated control of a vehicle and are representative of these existing navigation systems.

For example, U.S. Pat. No. 4,758,959 issued to Thoone et al., is indicative of both the ability and shortcomings of the existing systems. In U.S. Pat. No. 4,758,959, speedometers and accelerometers are utilized to estimate the vehicle's position and corrections are made to try to keep the vehicle positioned on the map. The map and the vehicle are displayed on a CRT. The operator inputs his source and destination points via a keyboard.

The problems associated with this kind of system are as follows:

1. The accelerometer and velocity sensors are subject to drift and can go out of calibration. Even if the sensors were perfect or if very accurate satellite positioning were possible, the maps available are not accurate, having been digitized from maps which are essentially hand drawn. Thus, it is difficult to determine what street or section of street the vehicle is actually on.

2. The presentation of a map on a CRT in a moving vehicle is a dangerous distraction, especially in heavy traffic found around cities.

3. The use of a keyboard for input from the driver is another distraction and could be dangerous to use while the vehicle is in motion.

4. The use of on-board sensors requires the use of specialized procedures with specially trained personnel for proper installation. Typically, this kind of installation is best done at the factory where the vehicle is built. Therefore, these devices miss the broad after-market of existing cars.

SUMMARY OF THE INVENTION

Accordingly, the following are some of the primary objects and advantages of the present invention:

1. To provide a navigation system which uses artificial intelligence algorithms to find the best route from source to destination, without requiring any sensors to locate the car;

2. To provide a navigation system which contains an audio, rather than a visual, interface with the driver and is thereby non-distracting;

3. To provide a means for the driver of the vehicle to negate or deny any turn instruction given by the computer and to demand an alternative route. This feature overcomes the need for extremely accurate maps in which every one-way street and every possible turn restriction (including time of day turn restrictions) have been incorporated;

4. To provide a navigation system having few mechanical parts in order to increase reliability and decrease the cost of production;

5. To provide a navigation system that can be built around a very inexpensive, portable compact disk music player which will keep the music functions while adding the navigation functions;

6. To provide a navigation system which does not have to be installed in the car. It can be portable or in the form of an AM/FM Compact Disc Radio and can be sold to anyone who already has a car;

7. To provide a navigation system with traffic avoidance capability, when digitized traffic information becomes available. An FM receiver can be tuned to pick up the latest traffic information and adjust street and highway speeds accordingly. The artificial intelligence routing algorithms in the device will automatically route the driver around congested areas;

8. To provide a navigation system which may optionally utilize a drive shaft rotation sensor as a convenience to alert the driver that his next turn is coming up. It can also aid in escaping a highway traffic jam which has been detected up ahead by the traffic update receiver (see 7 above);

In summary, the present invention is directed to a navigation system for a vehicle including means, such as a speech digitizer or an analog signal processor, for converting a spoken audio signal into a corresponding electrical signal and for storing said electrical signal as data in a location data memory. A microprocessor is coupled to the location data memory and to a map data memory for processing data from each of the memories according to a program stored in a program memory. The stored program includes path finding procedures for selecting a path between two points, a first point being represented by data stored in the location data memory and a second point being represented by data stored in the map data memory, and for generating a set of electrical signals representing a selected path. Means are coupled to the microprocessor for converting the set of electrical signals representing the selected path to an audibly perceptible signal.

A method for the navigation of a vehicle embodying the present invention includes the steps of: sensing a spoken audio command from the user and converting the sensed audio command into a corresponding electrical signal; storing the electrical signal as data in a location data memory; selecting a path between two points, a first point being represented by data stored in the location data memory, and a second point being represented by data stored in a map data memory by processing in a microprocessor data from the location data memory and from a map data memory according to a program stored in a program memory; generating a set of electrical signals representing a selected path; and, converting the set of electrical signals representing the selected path to an audibly perceptible signal.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

LIST OF REFERENCE NUMERALS

Figure 1:
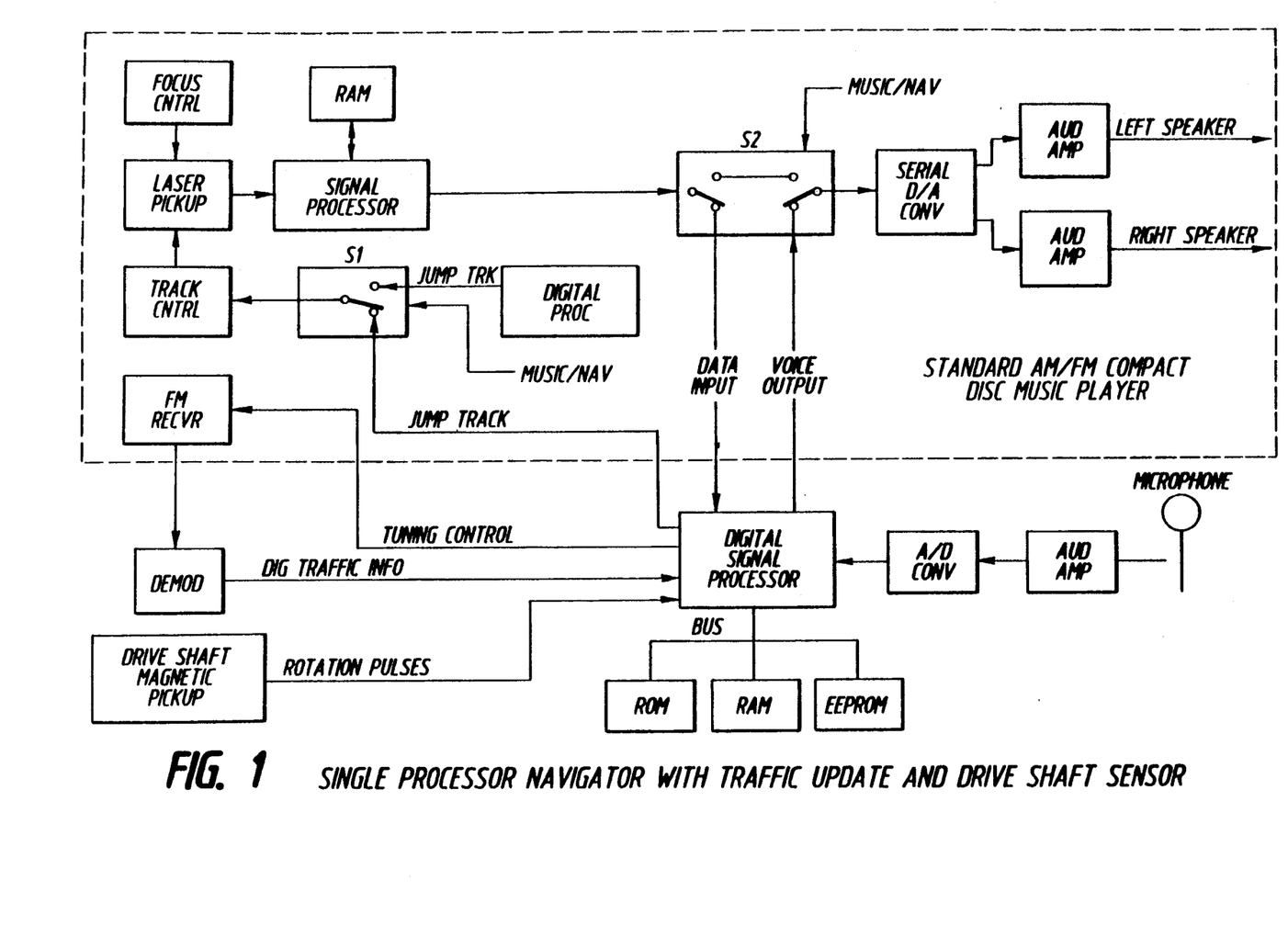
FIG. 1 is a navigator embodiment which contains a single processor, a compact disk with an FM receiver, and a drive shaft rotation sensor. The Digital Signal Processor is the more expensive 32 bit style processor which has a wide enough address space to perform the Navigation functions in addition to the Speech Processing and Disk Control functions. This embodiment can perform traffic avoidance functions.
Figure 2:
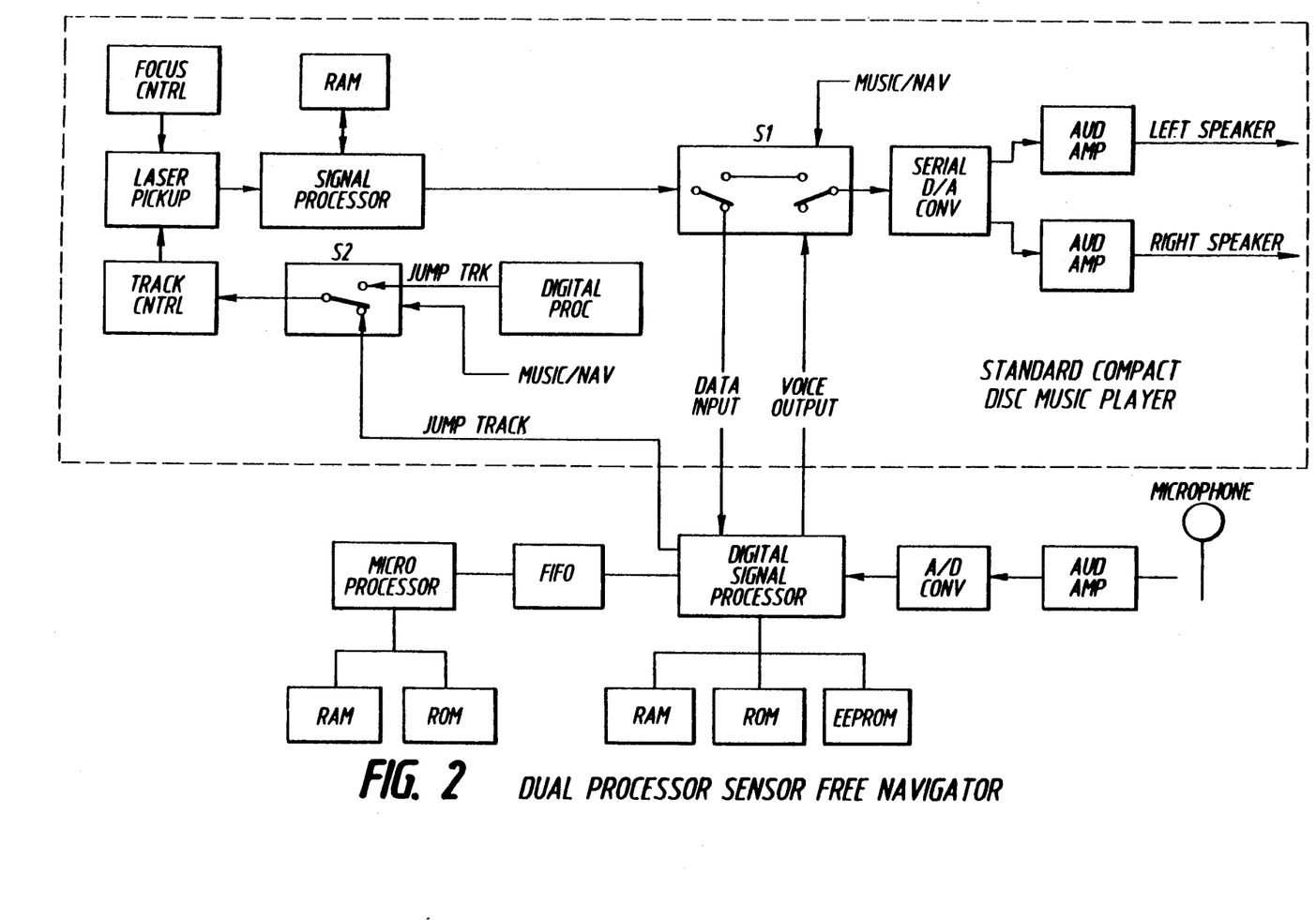
FIG. 2 is a navigator embodiment which contains two processors. The Digital Signal Processor is the less expensive 16 bit style which only has enough addressing capability to perform the speech processing and disc control functions. The Navigation functions, which require a larger address space, are done in a separate 32 bit Micro Processor. Communication between the two processors is by means of a FIFO. The compact disk player does not contain an FM radio and therefor this embodiment cannot perform the traffic update functions.
Figure 3:
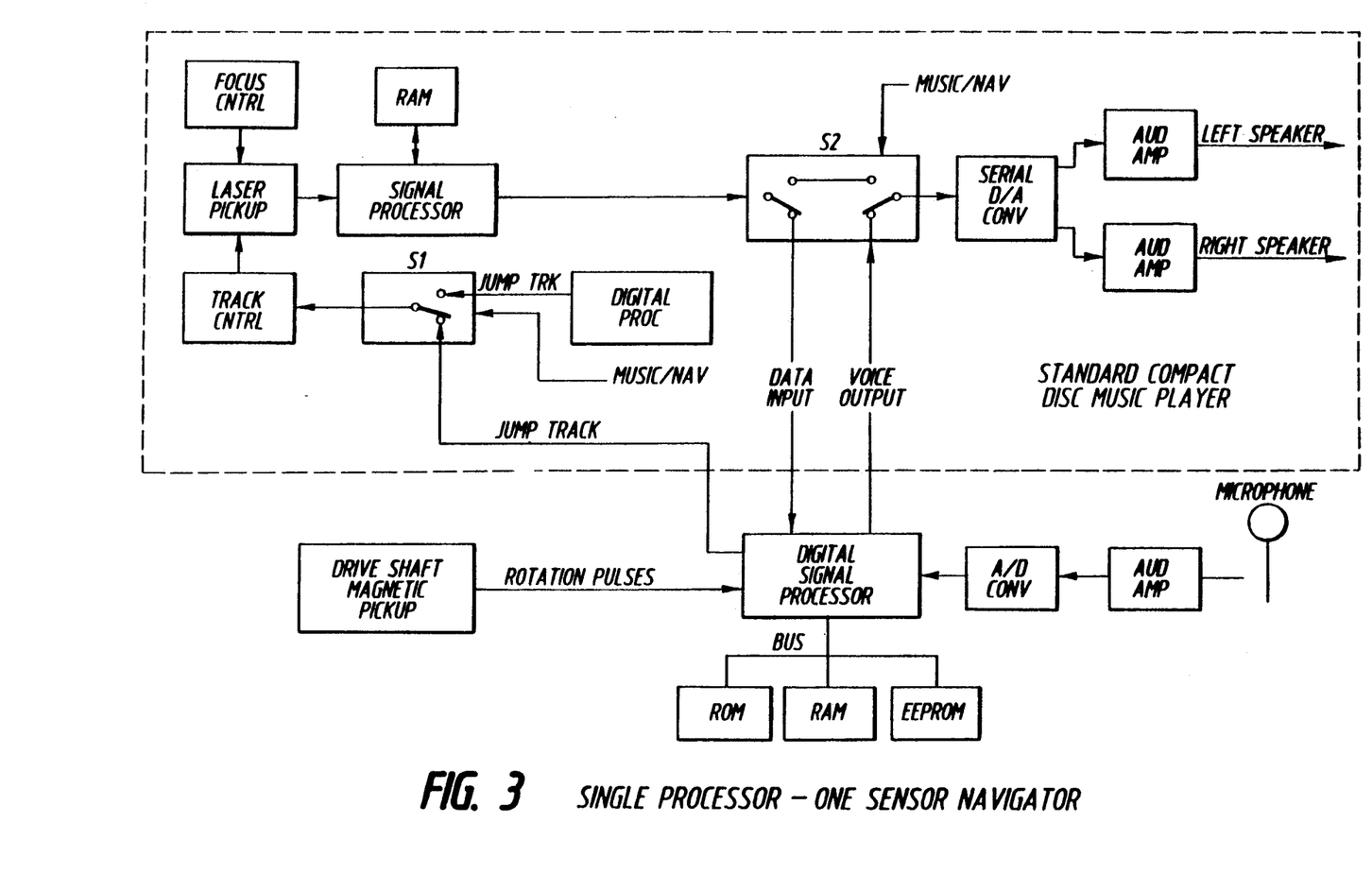
FIG. 3 is a navigator embodiment which contains a single processor and a drive shaft rotation sensor. It contains the more expensive 32 bit Digital Signal processor. The compact disk player does not contain an FM radio and therefor this embodiment cannot perform the traffic update functions.
Figure 4:
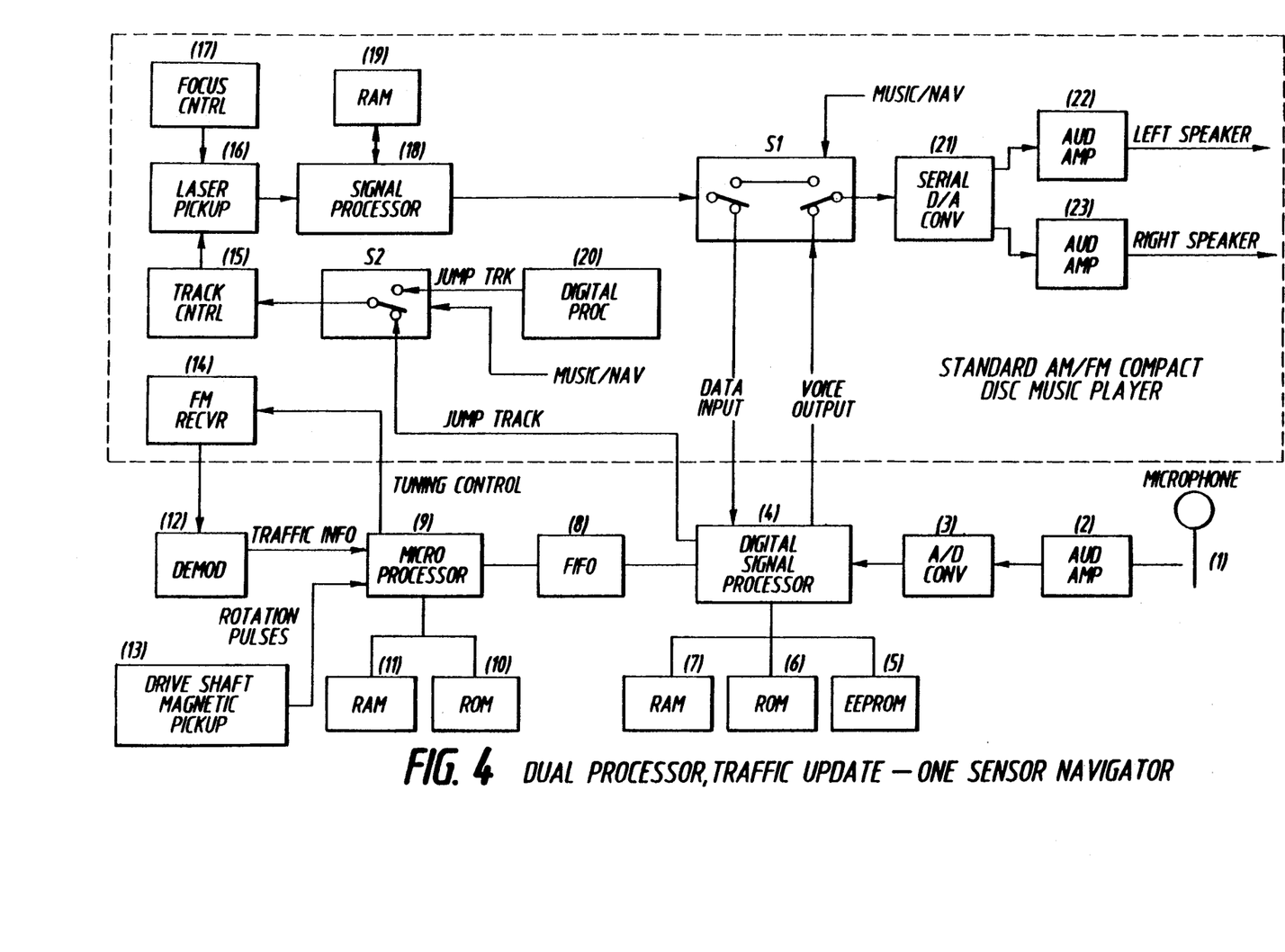
FIG. 4 is a navigator embodiment which contains two processors, a compact disk with an FM receiver, and a drive shaft rotation sensor.
Figure 5:
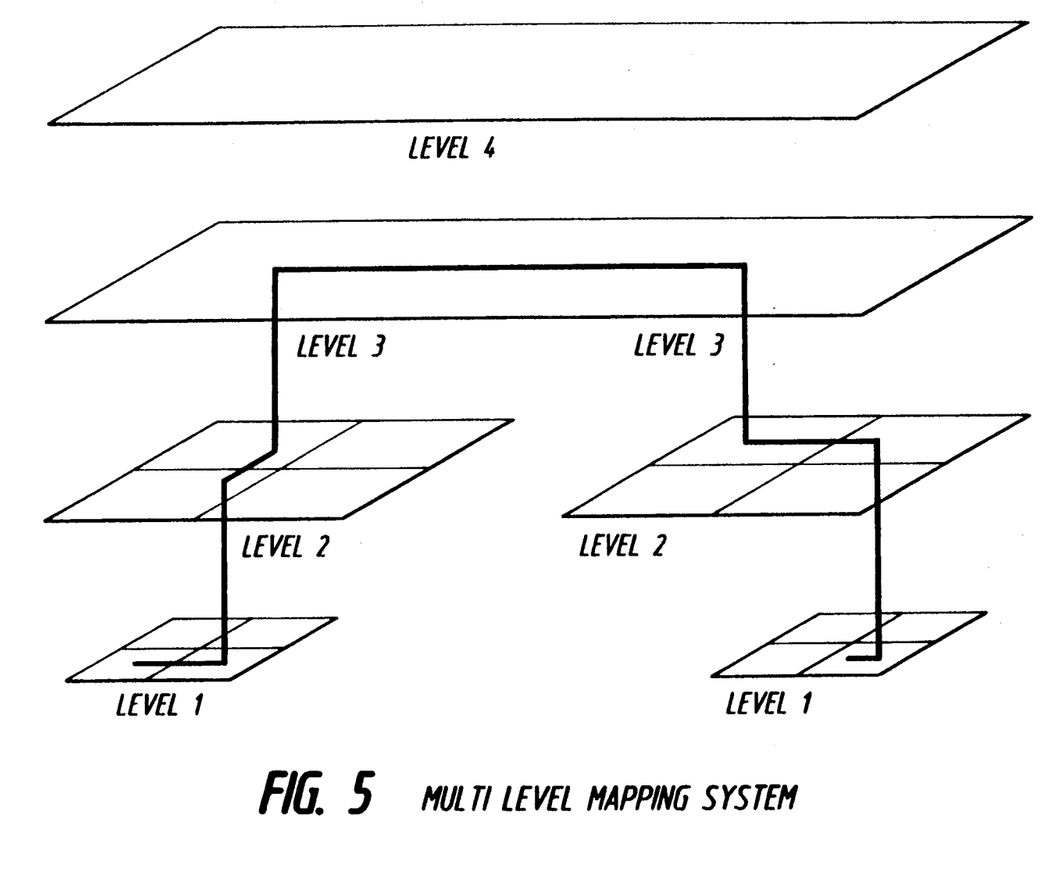
FIG. 5 shows how routing occurs utilizing a multi-level map data base.

Refer to FIG. 4

Micro Processor Components

1 Noise cancelling microphone
2 Audio amplifier for amplifying the signal from the microphone
3 Analog To Digital Converter for digitizing audio signal
4 Digital Signal Processor for disk and speech input/output
5 EEPROM for storing speech templates
6 ROM for storing the bootstrap routine
7 RAM for storing program, speech and map data
8 FIFO used for data transfers between the two microprocessors
9 Navigation Processor
10 ROM for storing the bootstrap routine
11 RAM for storing program and map data
12 Sub-carrier demodulator for retrieving digital traffic information
13 Optional drive shaft rotation sensor

Compact Disk Player Components

14 FM receiver
15 Tracking control servo
16 Three beam LAZER pickup
17 Focus control servo
18 Signal processor for error correction
19 Random access memory for data buffering
20 Digital processor for music functions
21 Serial digital to analog converter for voice and music output
22 Left speaker audio amplifier
23 Right speaker audio amplifier
S1 Music/Navigation selection switch
S2 Music/Navigation selection switch

BRIEF DESCRIPTION OF THE APPENDICES

The following APPENDICES A-C are computer program listing and the computer program listing will not be part of the printed patent.

APPENDIX A

Appendix A contains a program listing for controlling the microprocessor of the illustrated embodiment. Appendix A contains nine modules, A1-A9.

Module A1 contains a routing algorithm for computing the path from the starting address to the destination address.

Module A2 contains an input/output routine which enables the microprocessor to control the digital signal processor like a slave.

Module A3 is the executive routine which is used to call the other routines of the program.

Module A4 is an address matching algorithm which finds the node in the map data base which corresponds to an address.

Module A5 contains a spelling checker routine.

Module A6 contains a routine to create sentences for the enunciation of the computed path.

Module A7 contains a speech training routine.

Module A8 contains a data file of the voice templates for the digital signal processor.

Module A9 contains the helper file.

Module A10 contains a test program for the branch and bound/A* algorithm.

APPENDIX B

Appendix B contains the program for controlling the digital signal processor for speech recognition and speech creation.

APPENDIX C

Appendix C contains a program for compressing speech data utilizing an analog devices ADDS2101 DSP evaluation board to perform the A/D conversion process.

DETAILED DESCRIPTION OF THE DRAWINGS

Refer To FIG. 4

A directional Microphone (1) p the driver's voice.

An Audio Amplifier (2) amplifies the signal from the microphone and rolls off the frequencies above 4000 Hz.

A 13 bit (or better) Analog To Digital Converter (3) samples and quantizes the output of the audio amplifier at about 8000 Hz.

A high speed Digital Signal Processor (4) analyzes the digitized, sampled output and extracts important speech features. In the illustrated embodiment, the DSP (4) is a model 2111 integrated circuit manufactured by Analog Devices. Appendix B included with the present specification contains a program listing for operating the Digital Signal Processor (4) as a speech analyzer. The program listing of Appendix B is written in the BASIC programming language. The program may also be written in assembly language for the 2111 DSP integrated circuit.

EEPROM (5) or some equivalent nonvolatile memory is used for storing speech feature "templates" created by the Digital Signal Processor (4).

ROM (6) holds a minimal bootstrap program utilized by the Digital Signal Processor at startup or restart.

RAM (7) is used for temporary storage of optical disk data input by the Digital Signal Processor (4) from the optical disk (not shown).

FIFO (8) is used for data transfers between the Digital Signal Processor (4) and the Navigation Processor (9). The FIFO (8) may be implemented using memories on board the DSP (4).

The Navigation Processor (9) of the illustrated embodiment is a 68010 microprocessor manufactured by Motorola. Appendix A included within the present specification contains a program listing which includes modules A1-A9 for operating the microprocessor 9. Module A3 contains the executive portion of the program for calling the other routines. Module A9 contains the helper file (C language).

ROM (10) holds a minimal bootstrap program utilized by the Navigation Processor (9) at startup or restart.

RAM (12) holds digital map data used by the Navigation Processor (9).

Drive Shaft Rotation Sensor (13) is a magnet fastened to the drive shaft in the vicinity of a pickup coil, which provides a pulse each time the shaft rotates past the coil. Using this optional sensor, the computer can tell when the next turn is coming up and can therefor alert the driver with a pleasant sounding chime.

FM Receiver (14) is tuned to a traffic update channel by the Navigation Processor. The output of the receiver is demodulated by DEMOD (12) and passed to the Navigation Processor (9).

Track Control Servo (15) is used to maintain the LASER Pickup (16) over the center of an optical disc track or to slew inward or outward when a track jump needs to be performed. Track jump signals come from the Digital Processor (20) or from the Digital Signal Processor (4) depending on the setting of Switch S2.

Digital Processor (20) controls music playing when the unit is in the music mode.

Signal Processor (18) and its associated RAM (19) are used to de-interleave and to detect and correct errors in the music or data read from the optical disk. The corrected signal is routed to the Serial D/A Converter (21) or to the Digital Signal Processor (4) depending on the setting of Switch S1.

Serial D/A Converter (21) converts digitized music or voice records to analog waveforms for left and right channels. Sound is output via the left and right Audio Amplifiers (22 and 23).

Switches S1 and S2 select the system mode—music or navigation. When these switches are in the down (navigate) position, the Digital Signal Processor (4) receives optical disk data from the Signal Processor (18) and sends track jump commands to the Track Control Servo (15).

OPERATION OF THE INVENTION ILLUSTRATED EMBODIMENT (Refer To FIG. 4)

Speech Training

The type of speech recognition algorithm used by this navigator is a small vocabulary, speaker dependent recognizer. This type of recognizer requires a training phase in which the user says the words in the vocabulary several times in order to form templates against which future utterances can be matched. Training removes many problems associated with people who have unusual accents or voice qualities.

Figure 6:
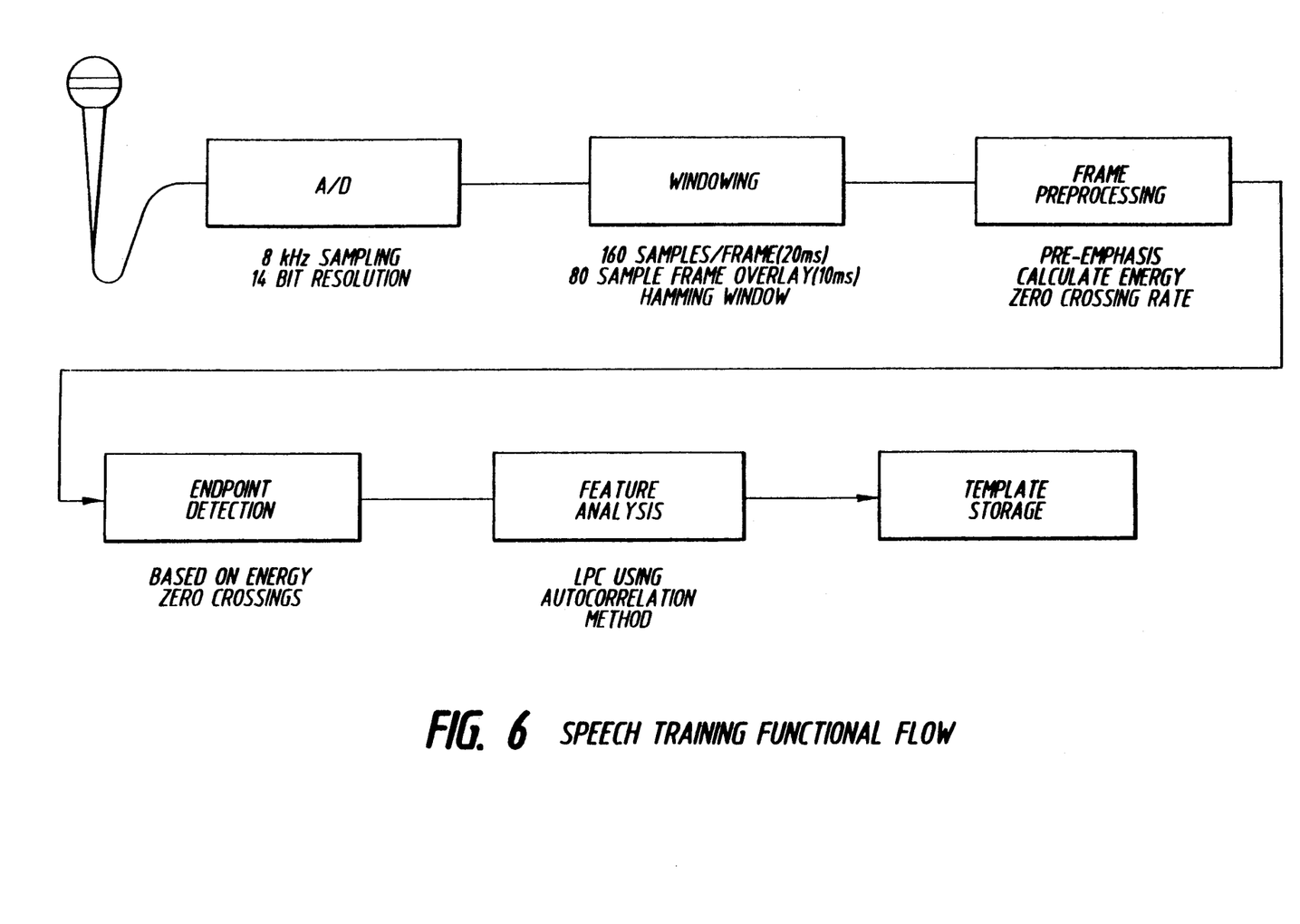
FIG. 6 is a flow diagram of the speech training process.

This training task is accomplished by the Digital Signal Processor (4) under the direction and control of the Navigation Processor (9) using primarily module A7 of the program of Appendix A. Refer to FIG. 6 for the training functional flow.

NOTE: Unless specifically stated otherwise, the word "computer" will be used from hereon to refer to both of these devices working together to perform particular functions.

To accomplish the training, a dialog between the computer and the operator is begun in which the computer asks the operator to say the letters of the alphabet A-Z, the numerals 0-9, and various control words needed by the computer, such as "Yes", "No", "No Turn", etc. The user responds by speaking the requested words into the directional Microphone (1).

An Audio Amplifier (2) conditions the signal, amplifying it and rolling off the high frequencies above 4000 Hz.

An Analog To Digital Converter (3) samples and quantizes the word being spoken at 8000 Hz and passes the quantized samples to the Digital Signal Processor (4).

The Digital Signal Processor (4), breaks the word into overlapping 20 msec frames and analyzes each frame for important features in a process known as "feature extraction". Features commonly extracted by commercial recognizers are total frequency band energy, Linear Predictive Coding (LPC) coefficients and cepstral coefficients which can be derived from LPC coefficients. The features are stored in EEPROM (5) as templates as module A8. Other non-volatile memories may be used such as FLASH memories, and battery backed up CMOS memories.

Test performed with the "NEC SAR-10 Voice Plus" speech demonstration card show that accurate recognition for this application requires two or three training passes. Additionally, since the audio navigator may be used regularly by more than one person, the EEPROM (5) must be large enough to hold two or three sets of templates for each person who will be using the device on a regular basis.

Speech Recognition

Speech input is required when the driver starts his trip and during the trip. When the driver starts his trip, he will verbally enter the address of his source and destination; during the trip, he will ask for the next instruction when he has completed the previous instruction.

Figure 7:
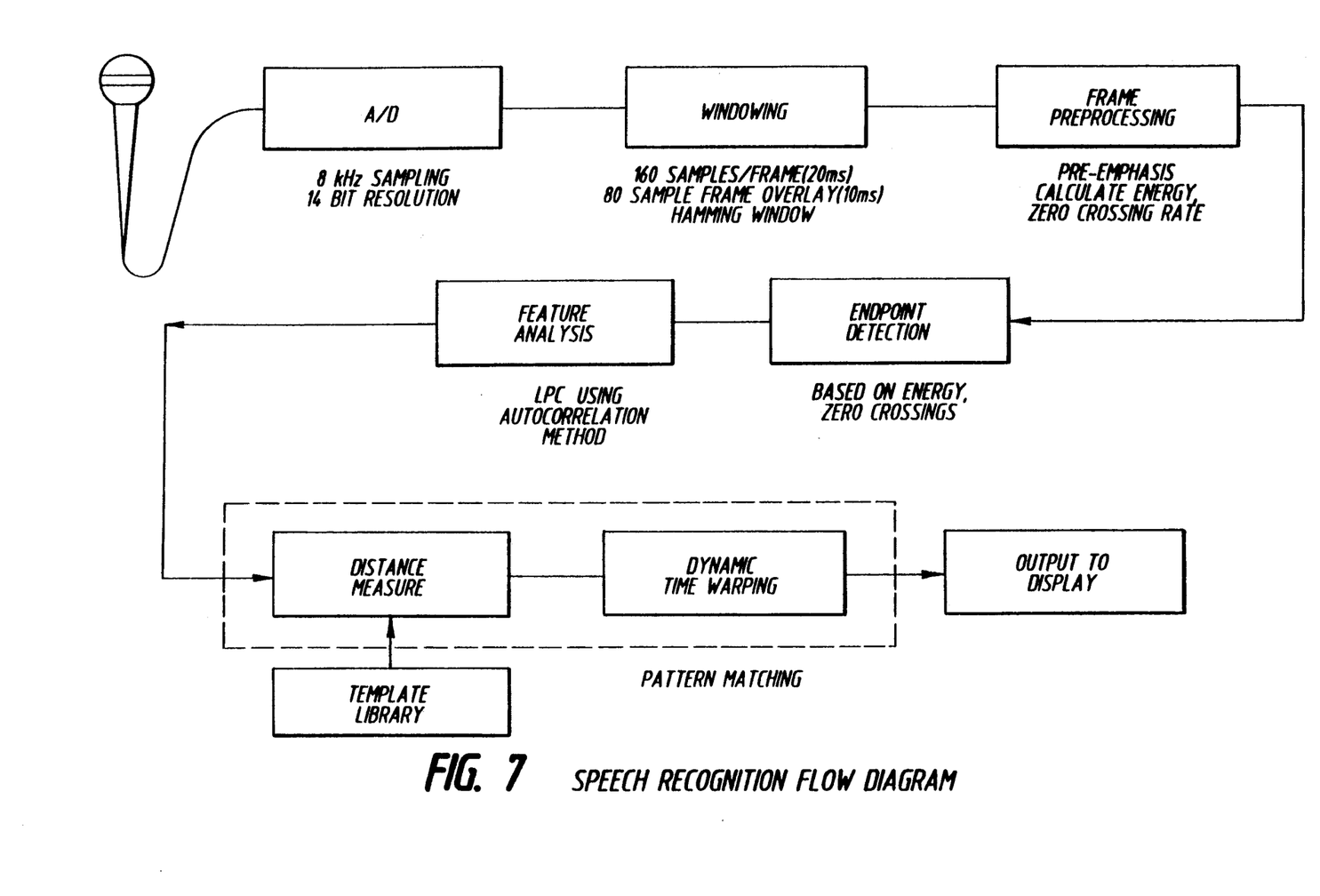
FIG. 7 is a flow diagram of the speech recognition process.

In order to recognize the word being spoken, the Digital Signal Processor (4) under the control of the Navigation Processor (9) using primarily module A2, extracts the features, just as was done during the training phase. But this time, the features of the spoken word are matched with the templates stored in the EEPROM (5) memory and the best match is taken to be the word spoken. Refer to FIG. 7 for a functional flow diagram of this process.

The matching process used is set forth in Appendix B and is called "Dynamic Time Warping" in which the features in the unknown word are time aligned and compared with each of the templates. The template with the smallest distance from the unknown word is the winner. An ASCII code for the recognized word is passed to the Navigation Processor (9) by means of the bi-directional FIFO (34).

Spelling Checker

In the English language (and in Spanish also) certain letters rhyme and can be easily confused by speech recognizers. Therefore, in this system, speech recognition is enhanced by use of spelling checker software (module A5), to remove ambiguities associated with letters which rhyme in the English alphabet, such as "B" with "P", "I" with "Y", "J" with "K". The spelling checker solves this by treating rhyming letters as nearly equivalent and using a scoring technique to pull the correct street name out of a number of possible spellings. Thus, the spelling checker makes speech input possible using imperfect speech recognizers. Without it, there would be too many errors and speech input would become impractical.

The spelling checker is required only for the English alphabet. The numeric digits from 0 to 9 do not rhyme with each other and therefore speech recognition of numbers is relatively easy to accomplish. A spelling checker is not possible and is not required for recognizing numeric digits.

To illustrate the power of the spelling checker, let us assume that the driver wants to spell the street name BARBARA STREET. Due to mis-recognition, the computer hears DKRVJRK STREET. When scoring is applied, however, the rhyming letters D, V, B and A, J, K give BARBARA STREET the highest score and so BARBARA STREET is chosen as the most likely street name. The correctness of this process has been verified many times in trial runs using prototype software and hardware.

Creating Speech Output Records

Digitized voice records are stored on the optical disc preferably in a highly compressed form using a Mu Law compression technique to achieve a compression of 64 Kbits/sec. It is anticipated that an enhanced LPC encoding technique may be used to achieve a compression of 13 Kbits/s while keeping the voice quality high.

The voice records are created at a work station, such as an IBM PC compatible computer using the program of Appendix C, where an actor or actress speaks the street names and the guidance words, such as "TURN LEFT ON", in his or her natural voice. The words are digitized, compressed and saved in a data base which is eventually placed on the optical disk.

By compressing the speech, the time to retrieve the word from the disk becomes smaller and the amount of RAM memory required for buffering is smaller, thus saving the cost of additional RAM memory.

This method is superior to voice synthesis and gives a natural, non-robotic sound. Since the optical disk contains sufficient space for digitized voice records, it is a cost effective way of implementing voice output.

Disk Input functions

The map data base and the compressed digitized voice records are stored on the optical disk (not shown). Additionally, to allow software updates, the software for both the Digital Signal Processor (4) and the Navigation Processor (9) are also stored on the disk. Both processors have minimal bootstrap programs stored in their respective on-chip or external ROMs (6 and 10)—just enough to allow the software stored on the optical disk to be loaded into the RAMs (7 and 12).

In order to read any particular sector on the disk, a signal is first sent to the Track Control Servo (15) via Switch S2 to open the tracking servo loop. Next, a slewing signal is sent to command the LASER Pickup (16) to move inward or outward. As the head moves past tracks on the disc, the servo loop generates a saw tooth shaped error function with a frequency which corresponds exactly to the rate at which track jumping is occurring. By counting saw tooth waves, the Digital Signal Processor (4) knows approximately on which track the read head is located.

When the read head is positioned near or past the required track, the Digital Signal Processor (4) closes the servo loop, allowing the LASER Pickup (16) to acquire data and pass it on to the Signal Processor (18) for de-interleaving and error correction. The error corrected output from the Signal Processor is serial pulse train of 16 bit words. This output is a routed to the Digital Signal Processor (4) via Switch S1 to be converted from serial pulses to 16 bit words.

If the data being read is map data, it is stored in FIFO (8) for use by the Navigation Processor (9). If the data being read are digitized voice records, the Digital Signal Processor (4) may store them in its own RAM (7) to be decompressed and output as described earlier or in RAM 17.

When Switches S1 and S2 are UP, the system is in the music mode and neither processor is active.

Speech Output functions

When the computer needs to speak to the operator, the Navigation Processor (9) using primarily modules A2 and A6, places into the FIFO (9) a list of pointers (optical disk sector numbers) to the compressed, digitized words to be spoken.

The Digital Signal Processor (4) retrieves the list from the FIFO (9), seeks to the correct sector number and reads the compressed records from the disc into RAM (7). Then it decompress the records and clocks the speech output data to the compact disk player's Serial Analog To Digital Convertor (21) via Switch S1.

The output from the DAC is amplified by the left and right Audio Amplifiers (60 and 62) and sent to a pair of speakers or headphones.

Traffic Avoidance functions

In the future, when State and Federal agencies begin to broadcast digitized traffic information over reserved FM frequency channels, this invention will be able to utilize updated highway speed information in calculating optimum routes. This gives the driver another use for the device, that of traffic avoidance.

To achieve traffic avoidance, the Navigation Processor (9) sends a signal to tune the FM Receiver (14) to the traffic avoidance frequency. The FM receiver's output is demodulated by the DEMOD (12) and the digitized highway speed information is input by the Navigation Processor (9). If, during a trip, the computer finds that one of the highways to be used on the trip has become congested, it does the following actions:

1. Calculates the delay which will be caused due to the highway slow down.

2. If the delay exceeds five or ten minutes, the computer informs the driver of the delay and asks him if he wants to calculate an alternate route.

3. If the driver agrees, the computer will calculate a route using the new speeds. If the route is different, the computer will tell the driver what the new route is, otherwise, it will tell the driver that his present route is still on the best route.

Map data base description

The map data base is stored on the optical disk. The data base contains the following elements:

Names list—a file of street names and pointers to corresponding digitized voice records. It is used for voice output of street names.

Street index—a file of street name numbers, grid numbers, and address ranges. It is used to find the grids surrounding the operator's source and destination addresses.

Level 1 grids—a file of street segments contained in the level 1 map grids. Level 1 grids are the most detailed and contain segments and linkages for (a) local streets, (b) major streets, (c) on-off ramps, (d) highway interchanges and (e) highways. Level 1 grids are about 1×1 mile in size. Four level one grids surrounding the source and destination points are read into RAM (12) prior to the route finding process.

Level 2 grids—a file of street segments contained in the level 2 map grids. Level 2 grids are less detailed and contains segments and linkages for (a) major streets, (b) on-off ramps, (c) highway interchanges and (d) highways; local streets are omitted. Level 2 grids are about 6×6 miles in size. Four level 2 grids surrounding the source and destination points are read into RAM (12) prior to the route finding process.

Level 3 grid—a file of street segments contained in the level 3 map grid. The level 3 grid has still less detail and contains segments and linkages for (a) on-off ramps, (b) highway interchanges and (c) highways. There is only one level 3 grid and it encompasses one or more counties.

Level 4 grid—a file of street segments contained in the level 4 map grid. The level 4 grid is the least detailed and contains segments and linkages for (a) highway interchanges and (b) highways. There is only one level 4 grid and it covers the a very large area, for example, Northern California. Level 4 is only used for routing from city to city over the highway system.

Voice data base description

For data bases which cover a relatively small area, such as a single city, a single level grid may be used.

Voice data base description

The voice data base is a file of compressed voice records. The record lengths are variable and contain digitized street names and guidance phrases, such as "BEAR LEFT ONTO . . . ", or "TURN RIGHT ON . . . ". They are formed by an actress speaking the words into a microphone at a work station which compresses the records and plays them back for editing.

Routing Algorithm

The routing algorithm utilized in this system is based on the A* path finding algorithm described by Peter Hart et al., "A Formal Basis for the Heuristic Determination of Minimum Cost Paths", IEEE Transactions System Science and Cybernetics, Vol. SS-4, No. 2, July, 1968. This path finding algorithm, also called a "Dynamic Programming" algorithm, has the advantage over other types of search algorithms in that it locates the best path without having to search all possible paths.

An example of such an A* algorithm is given in module A1. Various routing algorithm including the A* are discussed in the book "Artificial Intelligence" by Pattrick Henry Winston, pages 89-120. In tailoring the A* algorithm for this navigator, a modification was performed. That is, travel time was optimized rather than travel distance. This was done by incorporating street speed codes into the data base.

It is appreciated that the search can be conducted from arc center to arc center, rather than from node to node (nodes are points where two or more arcs intersect). It is believed that it takes less memory to store a network of arcs, and that it is easier to incorporate turn restrictions into the data base.

The implementation of the A* algorithm of module A1 differs from the usual implementation with regard to the data base layout. In order to understand the difference, some terms must first be defined.

A digitized road map data base, called a GRAPH, consists of a list of straight line segments called ARCS, which represent the streets. Curved streets are broken into a series of straight line arcs in order to approximate the curve.

The point at which two or more arcs intersect is called a NODE. A common example is the intersection of two streets in which four arcs meet at a central node.

Figure 8:
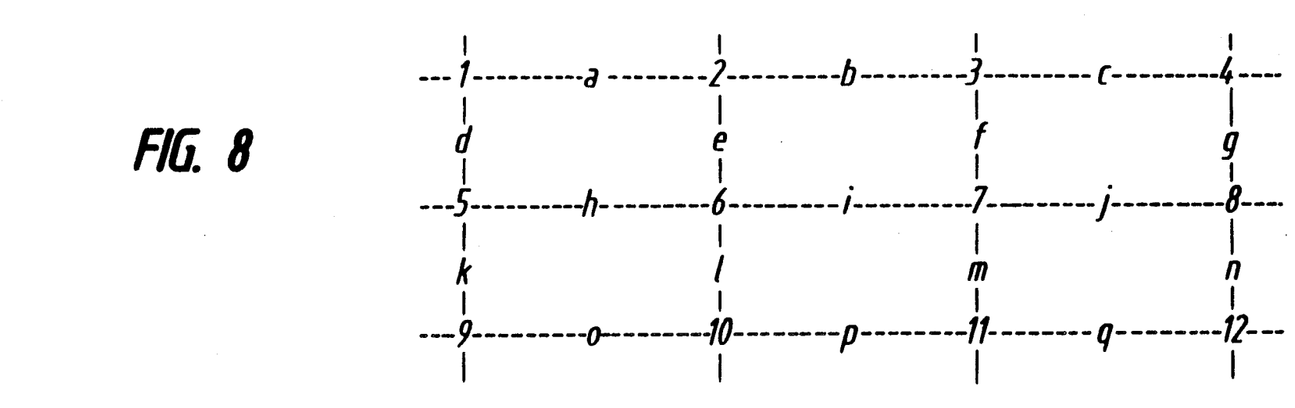
FIG. 8 is a graph of nodes and arcs of a map data base.

FIG. 8 shows an example of a graph containing 12 nodes and 17 arcs. In the usual implementation, all the NODE information is placed in a NODE list and all the ARC information is placed in an ARC list.

As a minimum, each node in the node list contains the node's x, y coordinates, points to each adjacent node, and pointers to the intervening arcs. Each arc in the ARC list contains the arc name (or a pointer to the name) and the COST (i.e., time or distance) of traveling along the arc.

Using the graph above, the list elements for node 6 and arc i would look like this:

NODE List element for node 6:
X coordinate
Y coordinate
Pointer to node 5
Pointer to node 2
Pointer to node 7
Pointer to node 10
Pointer to arc h
Pointer to arc e
Pointer to arc i
Pointer to arc l ARC List element for arc i:
Pointer to name of arc i
Travel time along arc i Once the data base is placed into the above format, the A* algorithm uses the pointers to compute that Node-To-Node Path which minimizes the cost of getting from a starting node to an ending node. In the above example, the A* algorithm might compute that least cost or shortest path from node 6 to node 3 would be path 6-7-3 in which the cost is sum of the distances of arcs i and f.

The drawback to the usual node/arc representation comes when turn restrictions are in effect. For example, the left turn from arc i onto arc f may be illegal. The data base as given thus may not contain sufficient information to prevent the A* algorithm from choosing a path that violates this turn restriction.

Therefore, a different layout of the data base has been chosen which accommodates itself more easily to turn restrictions as well as to one way street restrictions. In the illustrated embodiment, the NODE list is eliminated. Instead, all the arcs are placed in a single list containing both the arc definitions and pointers to adjacent arcs.

If a turn from one arc onto another is illegal, then the pointer to that adjacent arc is simply removed from the list or not included in the first place.

Figure 9:
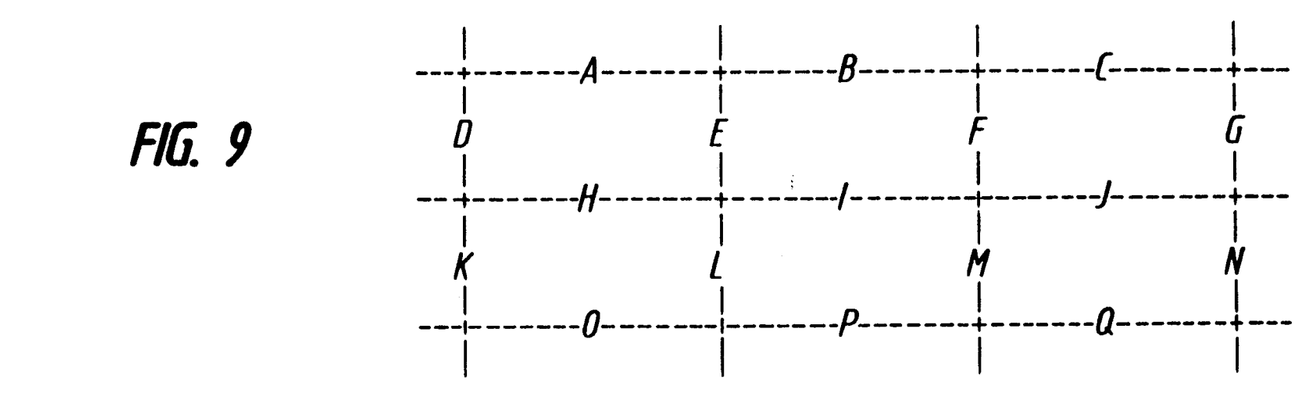
FIG. 9 is a graph of arcs of a map data base.

As an example, a similar case, containing 17 arcs is shown in FIG. 9. However, in this example, only the arcs are shown.

Using the graph of FIG. 9, the list element for arc I would look like this:

ARC List element for arc I:
Pointer to name of arc I
Travel time along arc I
X coordinate of center of arc I
Y coordinate of center of arc I
Pointer to arc H
Pointer to arc E
Pointer to arc L
Pointer to arc L
Pointer to arc J
Pointer to arc F (delete to prevent turn)
Pointer to arc M Note, to prevent a turn from arc I to arc F, the pointer to arc F is simply deleted.

Once the data base is placed into the above format, the A* algorithm uses the pointers to compute that ARC-TO-ARC Path which minimizes the cost of getting from a starting arc to an ending arc. In the above example, since the turn from arc I to F has been deleted, the A* algorithm might compute that least cost or shortest path from arc I to arc F would be path I-J-G-C-F which is a long, but legal path.

Note that the ARC data base layout uses 6 pointers instead of 8, thereby effecting a memory saving as well.

Also, if the optimization feature of this A* algorithm is too restricted resulting in failure to compute a solution, the less optimized branch and bound search may be used as set forth in module A10.

Alternate Routes function

To aid the driver in obtaining alternate routes when a road blockage or some turn restriction occurs, the capability is given the driver to negate the last instruction given by the computer in order to demand an alternate route. When the driver discovers that a turn can't be made, he says to the computer via the Microphone (1) "NO TURN" or "ONE WAY" or "LOST" as the case may be.

If the driver says "NO TURN", the computer breaks the arc linkage which connects the street he is on with the street he says he can't turn onto and re-calculates the route to the destination from his current position.

If the driver says "ONE-WAY", the computer will mark the entire connected street in memory as one-way and re-calculates the route.

If the driver says "LOST", the computer will ask him for his current location and will calculate the best route to his destination.

Address Matching function

To begin the navigation function, the computer as set forth in module A4 requests the driver to enter his starting and ending address, either as a street address or as the intersections of two streets. If an ambiguity occurs, the driver may be asked to enter the city name as well.

The street index in the map data base is used to locate the grids surrounding the address or street intersection specified by the user. These are the grids to be read into the RAM (12) for routing.

DIALOG WITH DRIVER

This section deals with the interface between the driver and the computer to accomplish navigation. The following are examples of the dialog—capital letters in quotes are used for the computer's responses, lower case letters in quotes for the driver's responses:

Dialog When Training The Voice

COMPUTER: "SAY THE LETTERS OF THE ALPHABET, A TO Z"
driver: "a, b, c . . . "
COMPUTER: "SAY THE LETTERS A TO Z AGAIN"
driver: "a, b, c . . . "
COMPUTER: "SAY THE LETTERS A TO Z ONE LAST TIME"
driver: "a, b, c . . . "
COMPUTER: "SAY THE NUMBERS, ZERO TO NINE
driver: "0, 1, 2, 3 . . . "
COMPUTER: "SAY THE NUMBERS ZERO TO NINE AGAIN"
driver: "0, 1, 2, 3 . . . "
COMPUTER: "SAY THE NUMBERS ZERO TO NINE ONE LAST TIME"
driver: "0, 1, 2, 3 . . . "
COMPUTER: "SAY THE WORD BLANK"

driver: "blank"
COMPUTER: "SAY THE WORD YES"
driver: "yes"
COMPUTER: "SAY THE WORD NO"
driver: "no"
COMPUTER: "SAY THE WORD NEXT"
driver: "next"
COMPUTER: "SAY THE WORD PREVIOUS"
driver: "previous"
COMPUTER: "SAY THE WORD REPEAT"
driver: "repeat"
COMPUTER: "SAY THE WORDS NO-TURN"
driver: "no-turn"
COMPUTER: "SAY THE WORDS ONE-WAY"
driver: "one way"
COMPUTER: "SAY THE WORD LOST"
driver: "lost"
COMPUTER: "SAY THE WORDS CROSS STREET"
driver: "cross street"

Dialog For Entering Source And Destination

COMPUTER: "YOUR NAVIGATOR IS READY"
driver: "navigator"
COMPUTER: "PLEASE SPELL THE STREET NAME OF YOUR STARTING POINT"
driver: "m-a-i-n enter"
COMPUTER: "PLEASE SAY THE STREET NUMBER"
driver: "cross street"
COMPUTER: "PLEASE SPELL THE NAME OF THE NEAREST CROSS STREET"
driver: "f-i-r-s-t enter"
COMPUTER: "LOCATING THE ADDRESS"
(short delay while computer locates the starting address)
COMPUTER: "PLEASE SPELL THE STREET NAME OF YOUR ENDING POINT"
driver: "o-a-k enter"
COMPUTER: "PLEASE SAY THE STREET NUMBER"
driver: "4-3-4-2 enter"
COMPUTER: "LOCATING THE ADDRESS"
(short delay)
COMPUTER: "PLEASE SPELL THE CITY NAME OF YOUR ENDING POINT"
driver: "s-h-e-r-m-a-n space o-a-k-s"

Dialog for getting the next or previous instruction:

COMPUTER: "YOUR TRIP FROM MAIN STREET TO OAK AVE WILL TAKE 34 MINUTES. YOUR TRIP DISTANCE WILL BE 12.4 MILES SAY NEXT, REPEAT OR PREVIOUS FOR INSTRUCTIONS
driver: "next"
COMPUTER: "PROCEED SOUTH ON MAIN STREET 5 BLOCKS" "STREET NUMBERS WILL BE DECREASING" "BEAR RIGHT ON DIXIE STREET"
driver: "next"
COMPUTER: "PROCEED WEST ON DIXIE STREET 2.4 MILES" "MAKE A HARD LEFT ONTO GROVE AVE"
driver: "repeat"
COMPUTER: "PROCEED WEST ON DIXIE STREET 2.4 MILES" "MAKE A HARD LEFT ONTO GROVE AVE"
driver: "next"
COMPUTER: "PROCEED EAST ON OAK AVENUE 7 BLOCKS" "YOU WILL BE AT YOUR DESTINATION"
COMPUTER: "DO YOU WANT TO LOG YOUR TRIP AS A BUSINESS TRIP?"
driver: "yes"

Dialog When Driver Can't Make Suggested Turn

COMPUTER: "PROCEED SOUTH EAST ON HAMILTON AVE 1.6 MILES"
COMPUTER: "MAKE A HARD LEFT ONTO JEFFERSON AVE"
driver: "no turn"
COMPUTER: "COMPUTING ALTERNATE ROUTE"
COMPUTER: "PROCEED SOUTH EAST ON HAMILTON AVE A BLOCK OR LESS"
COMPUTER: "TURN LEFT ON OXNARD STREET"
driver: "one way"
COMPUTER: "COMPUTING ALTERNATE ROUTE"
COMPUTER: "PROCEED SOUTH EAST ON HAMILTON AVE 2 BLOCKS"
COMPUTER: "TURN LEFT ON SOUTH STREET"
driver: "lost"
COMPUTER: "PLEASE SPELL THE STREET NAME OF YOUR CURRENT LOCATION"
driver: "2-n-d enter"
COMPUTER: "PLEASE SAY THE STREET NUMBER"
driver: "1-3-4 enter"

The invention described above is, of course, susceptible to many variations, modifications and changes, all of which are within the skill of the art. In should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A method of operating a speech-based data storage and processing system in order to produce navigation directions to assist travel from a starting location to a destination along a route consisting of a sequence of individually identifiable route segments selected from a plurality of route segments which occupy a geographic area and which intersect at nodes, comprising:
storing map information, including information identifying the plurality of route segments, in an electrically accessible storage medium in the system;
conducting a dialog with an individual in which the system issues audible spoken requests for identification of the starting location and of the destination and receives audible spoken responses from the individual;
converting audible spoken responses from the individual into respective stored representations of the starting location and the destination as represented by the spoken responses;
utilizing the stored representations to retrieve from the storage medium information identifying successive route segments forming a desired route between the starting location and the destination corresponding to the stored representations; and issuing successive audible spoken statements, each in response to an audible command spoken by the individual, each spoken statement describing a respective one of the successive route segments.

2. A method as defined in claim 1 wherein each route segment has a name and each audible spoken statement includes the name of the respective route segment and the direction of entry onto the respective route segment.

3. A method as defined in claim 1 comprising the preliminary step of recording a description of each route segment as spoken by a human speaker, and wherein said issuing step comprises issuing respective ones of the statements recorded during said preliminary recording step.

4. A method as defined in claim 1 comprising the further step of calculating a new route in response to a predetermined spoken command from the individual.

5. A method as defined in claim 1 wherein the audible spoken responses from the individual during said step of conducting a dialog comprising spelling of the names of the starting location and the destination.

6. A method as defined in claim 5 wherein said step of converting comprises:

identifying each spoken letter;

determining each letter of the alphabet, other than the identified spoken letter, which rhymes with the identified spoken letter, comparing combinations of identified spoken letters and determined rhyming spoken letters for a name with stored names; and identifying the stored name for which the comparison produces the best match with one of the combinations of letters.

7. A method as defined in claim 1 wherein said storing step is carried out to store the information identifying route segments in compressed form.

8. A method as defined in claim 1 wherein the stored map information includes, for each one of the plurality of route segments, information representing pointers to every route segment which intersects the one of the plurality of route segments.

9. A speech-based data storage and processing system for producing navigation directions to assist travel from a starting location to a destination along a route consisting of a sequence of individually identifiable route segments selected from a plurality of route segments which occupy a geographic area and which intersect at nodes, comprising:

an electrically accessible storage medium storing map information, including information identifying the plurality of route segments;

computer means connected to said storage medium for calculating a travel route from a given starting location to a given destination; and means connected to said computer means for effecting conversions between audible spoken statements and electrical signals corresponding to the audible spoken statements, wherein said means for effecting conversions are operative for: conducting a dialog with an individual in which said means for effecting conversions issues audible spoken requests for identification of the given starting location and of the given destination and receives audible spoken responses from the individual; converting audible spoken responses from the individual into respective stored electrical signals representative of the given starting location and the given destination as represented by the spoken responses;

said computer means are operative for utilizing the stored electrical signals to retrieve from the storage medium information identifying successive route segments forming a desired route between the given starting location and the given destination corresponding to the stored electrical signals; and said means for effecting conversions are further operative for issuing successive audible spoken statements, each in response to an audible command spoken by the individual, each spoken statement describing a respective one of the successive route segments.

10. A system as defined in claim 9 further comprising means coupled to said computer and to a radio for supplying to said computer electrical signals representing current traffic information.

11. A system as defined in claim 10 wherein said storage medium includes optical disc storage means.

12. A system as defined in claim 9, further comprising:

a device mounted in the vehicle to generate a signal representative of distance traveled by the vehicle and coupled to said computer means for supplying the signal representative of distance traveled to said computer means, and wherein said computer means are operative for providing an indication of an approaching turn in response to the signal representative of distance traveled.

13. A system as defined in claim 9 wherein said means connected for effecting conversions comprise an audio device selectively operable to reproduce musical performances and to issue the audible spoken requests and statements.

* * * * *